United States Patent [19]

Ishiguro et al.

[11] Patent Number: 4,849,819
[45] Date of Patent: Jul. 18, 1989

[54] ELECTRONIC STILL CAMERA

[75] Inventors: Yasuaki Ishiguro, Ohi; Yoshio Nara, Kawasaki; Yoshitaka Araki, Tokyo, all of Japan

[73] Assignee: Nikon Corporation, Tokyo, Japan

[21] Appl. No.: 9,624

[22] Filed: Jan. 23, 1987

Related U.S. Application Data

[63] Continuation of Ser. No. 551,362, Nov. 14, 1983, abandoned.

[30] Foreign Application Priority Data

Nov. 18, 1982 [JP] Japan .............................. 57-202440

[51] Int. Cl.⁴ .............................................. H04N 5/76
[52] U.S. Cl. ............................... 358/213.13; 358/906; 358/909
[58] Field of Search .................... 358/213.13, 906, 909, 358/225

[56] References Cited

U.S. PATENT DOCUMENTS

| | | | |
|---|---|---|---|
| 4,057,830 | 11/1977 | Adcock | 358/909 |
| 4,139,874 | 2/1979 | Shiraishi | 360/75 X |
| 4,338,009 | 7/1982 | Lee | 354/224 X |
| 4,366,501 | 12/1982 | Tsunekawa et al. | 358/310 |
| 4,420,773 | 12/1983 | Toyoda et al. | 360/35.1 X |
| 4,470,076 | 9/1984 | Arai et al. | 358/312 |
| 4,541,021 | 9/1985 | Konishi et al. | 360/72.1 X |
| 4,553,170 | 11/1985 | Aoki et al. | 358/909 |

FOREIGN PATENT DOCUMENTS

| | | | |
|---|---|---|---|
| 52-7709 | 1/1977 | Japan | 360/75 |
| 54-140507 | 10/1979 | Japan | 358/906 |
| 57-139758 | 8/1982 | Japan | 354/224 |

OTHER PUBLICATIONS

Translation of JP-54-140506.

Primary Examiner—L. T. Hix
Assistant Examiner—David M. Gray
Attorney, Agent, or Firm—Shapiro and Shapiro

[57] ABSTRACT

An apparatus for recording information on a sheet-like recording medium having a surface provided with a plurality of recording tracks formed concentrically about the center of rotation and guard bands provided between the recording tracks comprises first driving means for rotating the recording medium coupled to the recording medium, a magnetic recording head contacting the surface of the recording medium, means for energizing the recording head for a predetermined time by a time-serial electrical signal expressing the information, and second driving means for shifting the recording head in a direction across the recording tracks relative to the recording medium. The second driving means is adapted to shift the recording head from on one of the guard bands onto one adjacent recording track before the energizing means energizes the recording head and to shift the recording head from on the one recording track onto another adjacent guard band after the recording head has been energized for the predetermined time.

4 Claims, 6 Drawing Sheets

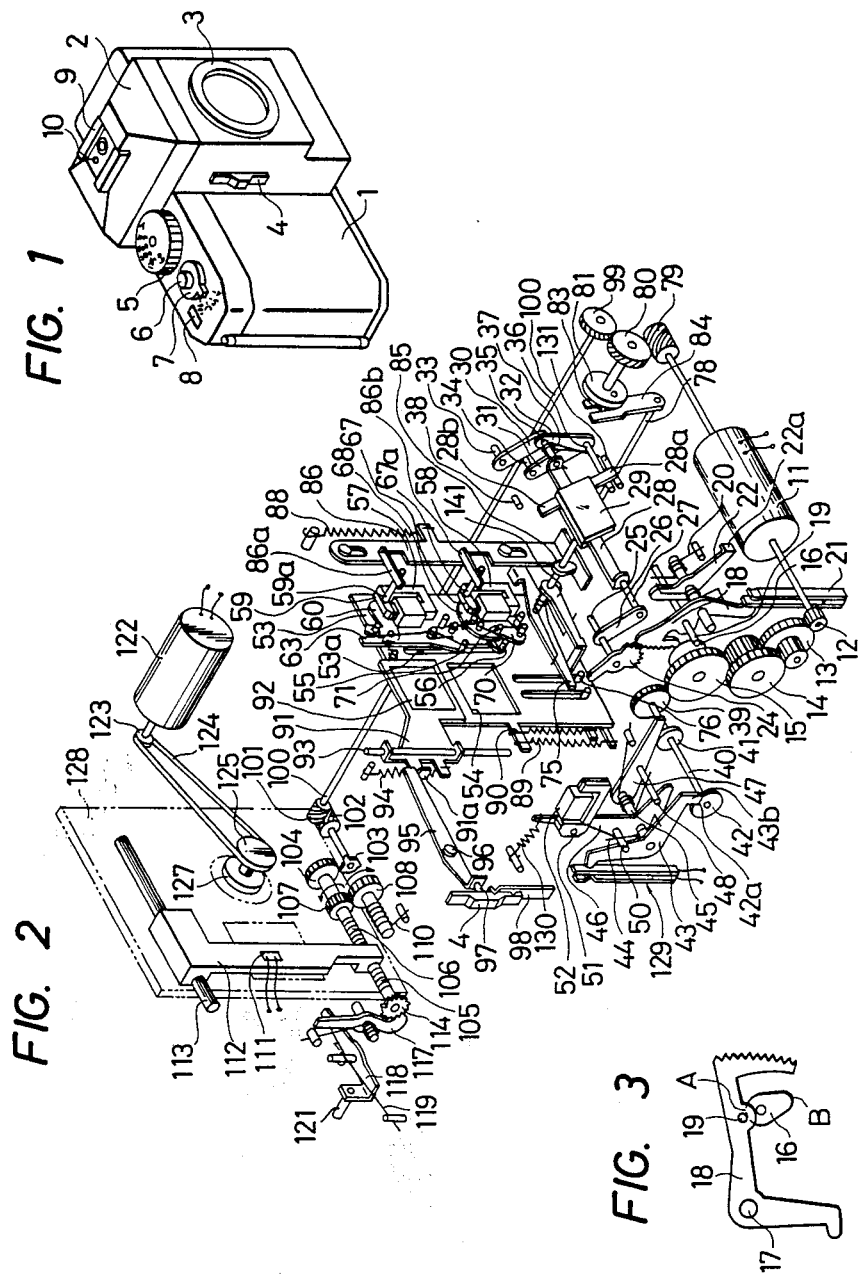

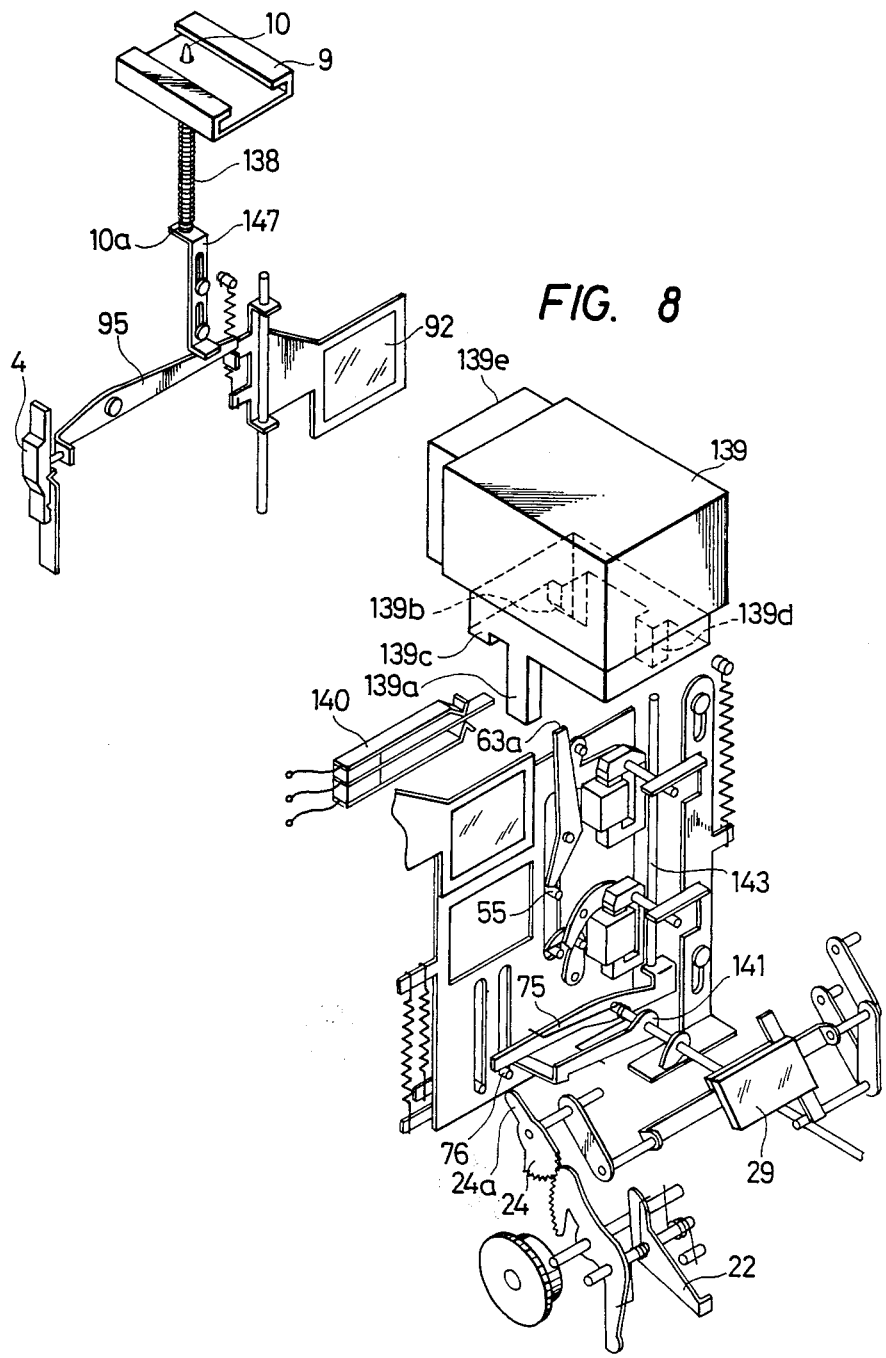

ELECTRONIC STILL CAMERA

This is a continuation application of Ser. No. 551,362 filed Nov. 14, 1983, now abandoned.

BACKGROUND OF THE INVENTION

1. Field of the Invention

This invention relates to an electronic still camera, and in particular to a camera which is of a size capable of being held by the hand of the photographer and in which an optical image is converted into an electrical data and recorded.

2. Description of the Prior Art

In an electronic still camera of the hand held type an optical image formed on an image sensor is converted into electrical data and recorded, whereby an effect equivalent to that of the conventional still image recording using a photosensitive film is obtained. In a popular type of electronic still camera, use is made of a magnetic disc and when the magnetic disc is inserted into the camera, the magnetic disc comes into contact with a recording head and the electrical data put out from the head is recorded on the rapidly rotated magnetic disc.

The magnetic disc inserted into the camera remains in contact with the magnetic head until it is removed from the camera. Therefore, if the period of time from after photographing of a still image has been completed till the next photographing is long, there is an undesirable possibility that the tracks on the disc which are in contact with the magnetic head during that time are deformed. For example, in a system wherein there is a long wait with the head set to the next track to be photographed after completion of recording, there is a possibility that the track to be photographed is deformed by the contact between the magnetic head and the magnetic disc, and in a system wherein the magnetic head is moved to a fresh track immediately before recording is started, there is a possibility that the previously recorded track is deformed by long contact between the magnetic head and the magnetic disc.

Also, due to the fact that the magnetic head is in contact with a recorded track or a track to be recorded at a point of time whereat photographing is started, the contact resistance between the magnetic head in its stationary state and the magnetic disc is great when rotation of the magnetic disc is started, and this may injure the disc. Of course, all of this holds true not only of electronic still cameras, but also of apparatuses in which recording and reproduction are effected with the head brought into contact with the magnetic disc.

In the electronic still camera shown in Japanese Laid-open Patent Application No. 140506/1979, there is provided a mechanism for retracting the magnetic head from the surface of the magnetic disc to prevent the magnetic head and the magnetic disc from being injured during the mounting or dismounting of the magnetic disc with respect to the camera and to permit smooth mounting or dismounting of the disc with respect to the camera, but this retracting mechanism works during the mounting or dismounting of the magnetic disc and requires a complex mechanism to retract the magnetic head until the magnetic disc reaches its steady rotation during each photographing, and this leads to bulkiness of the camera. For this reason, such mechanism has not been used in practice.

SUMMARY OF THE INVENTION

It is a principal object of the present invention to provide an electronic still camera provided with a recording system improved to enable good recording and reproduction on a magnetic disc.

The recording system of the present invention is designed such that the magnetic recording head is kept in contact with the space between a recorded track and a track to be recorded next time, namely, the guard band, during the time from after electrical data corresponding to a still image has been recorded on a track of the magnetic disc until recording of electrical data corresponding to the next still image is started.

The invention will become more fully apparent from the following detailed description thereof taken in conjunction with the accompanying drawings.

BRIEF DESCRIPTION OF THE DRAWINGS

FIG. 1 shows the appearance of an electronic still camera according to an embodiment of the present invention.

FIG. 2 is a perspective view showing the interior mechanism of the camera of FIG. 1.

FIG. 3 is an enlarged view of a part of FIG. 2.

FIG. 7 is a perspective view showing a mechanism concerned with change-over of a color temperature converting filter.

FIG. 8 is a perspective view showing a mechanism concerned with mounting of a view finder unit when the camera of FIG. 1 is used as a video camera.

DESCRIPTION OF THE PREFERRED EMBODIMENTS

Figure 4A:
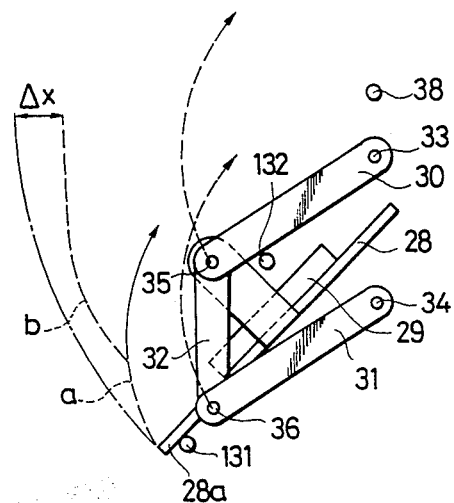
FIG. 4A is a side view of a mirror driving mechanism showing the mirror in its downward position.

Referring to FIG. 1, there is shown the appearance of an electronic still camera according to a first embodiment of the present invention. An interchangeable view finder unit 2 is provided on top of a camera housing 1, and a mount 3 for fixing a photo-taking lens unit is provided, on the front face of the camera housing 1. On the camera housing, there is provided a switch 4 for changing over and operating a color temperature converting filter, a dial 5 for changing over the shutter speed, a release button 6 for starting the photographing operation, a switch 7 for changing over the photographing mode, and a display window 8 of a counter for counting the photographing shot. A shoe 9 for fixing a flash unit and a pin 10 operatively associated with the color temperature converting filter are provided on the upper surface of the finder unit 2.

The interior mechanism of the camera is shown in FIG. 2. Designated by 11 is a motor for driving the mirror, charging the shutter and driving the recording head. Reduction gears 13, 14 and gear 15 are connected to a pinion gear 12 fixed to the output shaft of the motor. A cam 16 is fixed to the gear 15, as shown in FIG. 3, and a pin 19 studded in a lever 18 pivotable about a shaft 17 is in contact with the cam surface of the cam 16 and is biased by a spring 20.

The lever 18 is formed with teeth engaged with a sector gear 24. The sector gear 24 is fixed to a shaft 25 provided with an arm 26, and rotation thereof causes shafts 27, 35 and a support plate 28 rotatably coupled to the shaft 27 to be turned about the shaft 25 through the arm 26.

During one full rotation of the gear 15, the cam 16 imparts one reciprocal upward and downward movement to the pin 19, thereby causing the mirror to be moved upwardly and downwardly through elements 18 and 24–28. The mirror 29 is retracted out of the photo-taking optical path by being moved upwardly and is returned into the optical path by being moved downwardly.

Arms 30, 31 and 32 which support the mirror 29 constitute a four-articulation link, and pins 33 and 34 studded in the arms 30 and 31 provide fulcrums. The pin 33 is disposed in a coaxial relationship with the shaft 25, and shafts 35 and 27 studded in the arms 30 and 26 also disposed in a coaxial relationship.

Figure 4B:
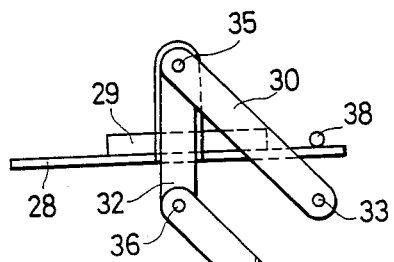
FIG. 4B is a side view of the mirror driving mechanism showing the mirror in its upward position.

The mirror 29 may be moved upwardly by the action of this link mechanism, as shown in FIGS. 4A and 4B.

In the lowered position of the mirror shown in FIG. 4A, the support plate 28 is pressed onto a pin 131 by a spring 37. Further, the arm 30 is pressed onto another fixed pin 132 by the biasing force of the aforementioned spring 20. In this condition, the arrangement of the parts is such that some gap is created between the pin 36 and the support plate, 28. That is, the position of the mirror 29 before being upwardly moved is determined by the fixed pins 131 and 132. When the arm 26 is rotated counter-clockwise, the arms 30 and 31 in FIG. 4A are both rotated clockwise about pins 33 and 34 and the shafts 35 and 36 are moved upwardly along the paths indicated by broken lines. If the lengths of the arms 30 and 31 are made equal to each other and the lengths of the arm 32 and the space between the fulcrums 33 and 34 are made equal, the arm 32 will effect parallel movement with movement of the mirror. When the arm 30 starts to rotate, the lower end 28a of the support plate 28 becomes disengaged from the fixed pin 131 and instead, the shaft 36 is caused to bear against the support plate by the biasing force of spring 37. Thereafter, the support plate 28 moves upwardly while assuming the same posture relative to the arm 32. The fore end of the support plate 28 follows a path a until the upper and 28b of the support plate bears against a fixed pin 38 and thereafter rotates clockwise about the fixed pin 38 while rotating about the shaft 35, and as a result, the fore end of the support plate follows a path b and completely retracts from the photo-taking optical path as shown in FIG. 4B when the upward movement thereof is completed.

The downward movement of the mirror follows a stroke reverse to that of the upward movement of the mirror. Just before the downward movement of the mirror is completed, the arm 30 has its position controlled by the fixed pin 132 and therefore, a slight gap is created between the pin 19 and the cam 16.

The mirror driving mechanism of the present embodiment has a range of movement smaller by Δx in the direction of the optic axis relative to the path of the conventional mirror indicated by a dot-and-dash line in FIG. 4A and therefore, the mirror box can be formed compactly. The lengths of the arms 30 and 31 which constitute the link mechanism can be set arbitrarily to adjust the amount of backward movement during the upward movement of the mirror and the path of upward movement of the mirror.

Figure 4C:
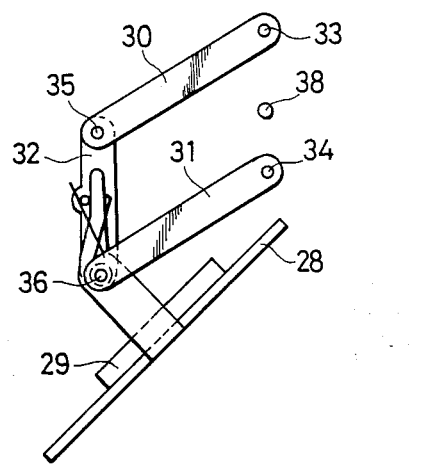
FIG. 4C shows a mirror driving mechanism according to another embodiment with the mirror in its downward position.

Also, as shown in FIG. 4C, the support plate 28 may be constructed so as to be rotatably supported about the pin 36 of the arm 31. A gear 39 meshing with the gear 15 has ½ of the number of teeth of the gear 15 and is fixed to a shaft 40 to which a cam 41 and a disc 42 having a cut-away 42a are fixed. The amount of lift of the cam 41 acting on a lever 47 is maximum. Upon starting of photography, a combination magnet 52 loses its attraction and liberates an armature 51 with a current flowing to the coil thereof in response to depression of the release button 6 and therefore, a lever 46 holding the armature 51 is rotated counter-clockwise about a shaft 45 by the biasing force of a spring 130. At this time, a pin 48 studded in a lever 47 does not hamper the rotation of the lever 46. A pin 50 is studded in the lever 46 and due to the rotation of the lever 46, the pin 50 bears against the end surface of a restraining lever 43, whereafter the armature lever 46 and the restraining lever 43 rotate together with each other to cause a phase switch 129 to conduct and close the power supply circuit of the motor 11.

The engagement between the restraining piece 43b of the restraining lever 43 and the cut-away 42a of the disc 42 is released by the rotation of the restraining lever 43, and the revolution of the drive motor 11 is transmitted to the cam gear 15, whereby upward movement of the mirror is started. During the time that the cam 41 makes one full rotation by the revolution of the motor 11, that is, the upward movement stroke of the mirror is completed, the amount of lift of the cam 41 to the lever 47 decreases from the maximum amount to the minimum amount. During this period of time, the lever 46 is rotated clockwise against the force of spring 130 by the pin 48 studded in the lever 47 and the armature 46 is again attracted to the combination magnet 52. When the cam 41 makes just one full rotation and the upward movement of the mirror is completed, the disc 42 also makes one full rotation and the cut-away 42a thereof becomes opposed to the restraining piece 43b and therefore, the restraining lever 43 is rotated clockwise by the biasing force of spring 44 and the cut-away 42a comes into engagement with the restraining piece 43b, and the phase switch 129 becomes non-conductive with a result that the supply of power to the motor 11 is cut off.

The shutter mechanism is fixed to a base plate 53 formed with an exposure aperture 54. The base plate 53 has an anti-vibration treatment applied thereto to absorb any vibration caused by movement and stoppage of the shutter and prevent any influence upon the rotation of the magnetic recording disc.

Figure 5:
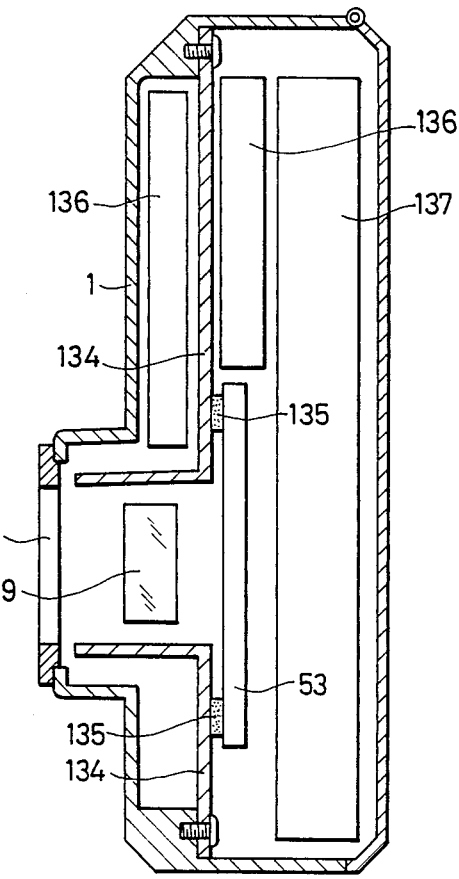
FIG. 5 is a schematic cross-sectional view of the camera of FIG. 1.

As shown in FIG. 5, an electric circuit device 136 and a magnetic recording device 137 are fixed to a fixed frame 134 in the interior of the camera housing 1. The base plate 53 which supports the shutter mechanism is attached to the frame 134 with a vibration absorbing member 135 interposed therebetween. The vibration absorbing member 135 is, made of rubber, spring metal or high molecular weight material having a property of absorbing vibration energy.

By applying such anti-vibration, treatment to the base plate, it is possible to reduce the waiting time from after exposure is completed until an image signal held by the image pick-up device is written into the recording disk and this is advantageous to continuous photography effected at a high speed.

A first magnet 57 for restraining the leading curtain of the shutter and a second magnet 58 for restraining the trailing curtain of the shutter are fixed to the base plate 53. The first and second magnets 57 and 58 attract the armatures 56 and 67, respectively, of levers 60 and 68 when power is supplied to the coils of these magnets. The base plate 53 is formed with a guide groove 53a for first and second pins 55 and 56 operatively associated with a leading curtain and a trailing curtain, respectively (not shown). In the charged condition of the shutter, the pins 55 and 56 are restrained by levers 63 and 70, respectively.

When the supply of power to the first magnet 57 which has so far been supplied with power is cut off by an exposure start signal, the armature 59 is liberated from its attracted condition and the lever 60 is rotated counter-clockwise by the biasing force of a spring, and a pin studded in the lever 60 bears against the end surface of the lever 63 and thus, the lever 63 is rotated counter-clockwise to release the restraint of the first pin 55. The leading curtain is moved upwardly by the spring 90, thus starting the exposure.

Next, when an exposure completion signal is put out, the supply of power to the second magnet 58 is cut off and the armature 67 is liberated from its attracted condition, so that the lever 68 is rotated counter-clockwise by the biasing force of a spring and bears against a pin 71 studded in the lever 70 and thus, the lever 70 is rotated clockwise to release the restraint of the second pin 56. The trailing curtain is moved upwardly by a spring 89, thus terminating the exposure.

A shutter charge lever 75 and an armature setting lever 86 are moved to their positions in which they do not hamper the movements of the leading and trailing curtains, immediately before the exposure is started. The revolution of the motor 11 during the upward movement stroke of the mirror is transmitted to a screw gear 80 meshing with a screw gear 79 fixed to the motor shaft, and a pin 83 studded in a disc 81 causes a fork lever 84 to pivotally move about a shaft 78. If the number of teeth of the gear is set so that a disc 81 makes one-half of one full rotation during the time that the disc 42 makes one full rotation, the shaft 78 rotates clockwise by an amount corresponding to the amount of pivotal movement of the fork lever 84 when the upward movement of the mirror is completed, and a lever 141 fixed to the shaft 78 rotates clockwise rotates the shutter charge lever 75 pivotably supported on the shaft 78 and causes it to retract from the path of movement of a charge pin 76 which is displaced downwardly for the charging of the leading and trailing curtains. Further, a cam 85 fixed to the shaft 78 is rotated clockwise and therefore, the lever 86 is caused to slide upwardly by the biasing force of a spring 88, and contact pieces 86a and 86b move away from pins 59a and 67a studded in the armature and thus do not hamper rotation of the levers 60 and 68.

Shutter charge is accomplished by the revolution of the drive motor for causing the downward movement stroke of the mirror, i.e., the second half rotation of the gear 15. The fork lever 84 pivots in the direction opposite to the direction of movement thereof during the upward movement of the mirror and the shutter charge lever 75 charges the charge pin 76 to the position of FIG. 2 by counter-clockwise rotation thereof, and the lever 86 is lowered to the shown position by rotation of the cam 85 and the contact pieces 86a and 86b which themselves have a springy property bias the pins 59a and 67a to cause armatures 59 and 67 to bear against first and second magnets 57 and 58, respectively.

The revolution of the motor 11 is transmitted to a bevel gear 99 meshing with the screw gear 80 and via a shaft 100 to a screw gear 102 meshing with a screw gear 101. The rotation of the screw gear 102 is transmitted to an intermittent drive gear 103 and also transmitted as intermittent rotation to a gear 104 meshing with the intermittent drive gear 103. A gear 107 and a ratchet gear 114 are fixed to a shaft 106 which in turn is fixed to a gear 104, and further a thread 105 is formed on the shaft 106. A support arm 112 which supports a magnetic recording head 111 is in mesh engagement with the thread 105.

In the position of FIG. 2 wherein a ratchet gear 114 meshes with a ratchet pawl 117, the motor 11 starts to revolve, and during the upward movement stroke and the downward movement stroke of the mirror, the intermittent drive gear 103 rotates clockwise and one tooth thereof meshes with the gear 104 to thereby rotate the gear 104 counter-clockwise. If the angle through which one tooth of the intermittent drive gear 103 rotates the gear 104 is $\theta$ and the number of teeth n of the ratchet gear 114 is set so that $\theta < 360/n < 2\theta$, the rotation of the gear 104 through $\theta°$ causes the mesh engagement between the ratchet gear 114 and the ratchet pawl 117 to shift to the next tooth. A gear 108 which is in mesh engagement with the gear 107 is biased counter-clockwise by a spring 110 and therefore, after the feeding by one tooth of the gear 103 has been terminated, the ratchet gear 114 is rotated in reverse direction and comes into mesh engagement with the ratchet pawl 117 and is stopped thereby. Thus, the shaft 106 reliably rotates by an amount corresponding to one tooth of the ratchet gear 114 during the upward and the downward movement stroke of, the mirror. By the rotation of this shaft 106, the thread 105 causes a head supporting arm 112 to move along a guide rail 113 to thereby feed a head 111 on the recording surface of a magnetic recording disc contained in a magnetic disc case 128 from the outer periphery thereof toward the center or from the center toward the outer periphery.

A lever 118 acting on the ratchet pawl 117 has a pin 121 which is in contact with the back lid of the camera, not shown, and is rotated clockwise by a spring 119 when the back lid is opened, thereby rotating the ratchet pawl 117 to release the mesh engagement thereof with the ratchet gear 114. By this, the shaft 106 is rotated clockwise with a spring 110 as the drive source and returns the head 111 to its start position. Rotation of a small pulley 123 fixed to the shaft of a disc driving motor 122 for rotatively driving the disc is transmitted to a large pulley 125 by a belt 124 to rotate a disc coupling 127. Since the magnetic recording disc and the disc coupling 127 are engaged with each other in a conventional manner, the disc rotates with the disc coupling 127, whereby it is possible to effect magnetic recording on the recording portion of the disc which bears against the head 111.

A color temperature converting filter 92 is mounted to a frame 91. This filter 92 serves to transmit therethrough incident light rays of high color temperature while reducing the color temperature of such light rays. In the case of photography under a light source of high color temperature such as the sun light and the illuminating light from the flash unit, the filter 92 is inserted into the photo-taking optical path to thereby reduce the color temperature of light rays imaged on an unshown image pick-up portion (such as, for example, the image pick-up surface of an image pick-up tube or a solid state image pick-up element) disposed rearwardly of the shutter and in contrast, in the case of photography under an electric light in a room, the color temperature of the light source is low and for this reason, the filter 92 is retracted from the photo-taking optical path to thereby ensure object light of a predetermined color temperature to be imaged on the image pick-up surface, thereby obtaining a picture plane of good color balance.

The filter frame 91 has its bent portion 93 guided by a shaft 93 and is biased upwardly by a spring 94. When the change-over switch 4 is slid upwardly with the filter 92 retracted from the aperture 54, a lever 95 rotates clockwise about a shaft 96 through a pin 97 studded in the switch 4 to downwardly depress the bent portion 91a of the frame 91 and move the filter 92 into the photo-taking optical path between the mirror and the aperture.

The inserted and retracted positions of the filter relative to the aperture are maintained by a click spring 98.

When the mode change-over switch 7 is registered to an index mark S, a single shot mode is selected in which photographing of a still picture is effected during each release operation. When the release button 6 is depressed by one stroke, the metering circuit system and the exposure operating circuit system start to operate and drive the display means to inform the photographer of a proper exposure or put out a proper aperture value and/or a proper shutter time.

Further, in the meantime, the disc driving motor 122 starts to revolve and when the disc reaches a predetermined rotation, the display means, not shown, informs the photographer of the possibility of photographing. When the release button 6 is further depressed to its second stroke after the disc has reached the predetermined rotation, power is momentarily supplied to the combination magnet 52 and the levers 46 and 43 are displaced to close the phase switch 129 and release the engagement between the lever 43 and the disc 42.

Upon closing of the switch 129, the supply of power to the motor 11 is started, which thus starts to revolve.

The revolution of the motor 11 rotates the lever 18 via the gears 13–15 and the cam 16. An aperture interlocking lever 22 which bears against one end of the pin 19 is rotated clockwise with the lever 18 and the stop mechanism, not shown, of the photo-taking lens engaged with the end portion 22a of the lever 22 is stopped down to an aperture value preset or calculated by the exposure operating circuit system. The rotation of the lever 18 moves the elements 24–28 and moves the mirror 29 upwardly. At this point of time, the disc 42 makes one full rotation in forward direction and the cut-away 42a thereof again comes into engagement with the restraining piece 43b. The phase switch 129 is now opened to stop the motor 11. The switch 21 is closed by the end portion of the lever 18 immediately after the motor 11 starts to revolve and the mirror 29 starts to move upwardly, and holds the output of the metering circuit at that point of time.

The first and second magnets 57 and 58 are electrically energized by the closing of the switch 21 and attract the armatures 59 and 67. Therefore, by the continued revolution of the motor 11, the cam 85 is rotated and the lever 86 is moved upwardly and, even if the contact pieces 86a and 86b become disengaged from the pins 59a and 67a, the first and second pins 55 and 56 continue to be restrained.

After the upward movement of the mirror is completed, the first magnet 57 is electrically deenergized and the restraint of the leading curtain is released and the leading curtain starts to move and thus, exposure is initiated. After the lapse of a time corresponding to a preset shutter time or of a proper exposure time calculated from the metering output and the aperture value of the lens after the first magnet 57 has been electrically deenergized, the second magnet 58 is electrically deenergized and the restraint of the trailing curtain is released and the trailing curtain starts to move and thus, exposure is terminated. Downward movement of the mirror 29 is started after completion of the recording of image signals on the magnetic recording disc carried out after a delay time from the completion of the movement of the trailing curtain. The delay time is set so as to correspond to the period of time, after the completion of the movement of the trailing curtain, required for recovery of the disc from the fluctuation of the rotation of the disc due to the vibration caused by the operation of the shutter. The delay time may also be started by the conduction of a shutter switch provided in the shutter, which switch is adapted to conduct at the point of time whereat the supply of power to the second magnet 58 is cut off or immediately before the movement of the trailing curtain is completed.

Upon completion of the recording on the disc, the combination magnet 52 is again momentarily supplied with power and liberates the armature 51 which has so far been attracted thereto. Accordingly, the phase switch 129 is closed, the supply of power to the motor 11 is started and by the second half of the one full rotation of the gear 15, downward movement of the mirror is accomplished. By the then revolution of the motor, the shutter charge lever 75 depresses the pin 76 to its shown position to thereby effect shutter charge, and the lever 86 is moved downwardly to cause the armatures 59 and 67 to bear against the first and second magnets 57 and 58, respectively.

Operation of the head 111 will now be described.

Figure 6:
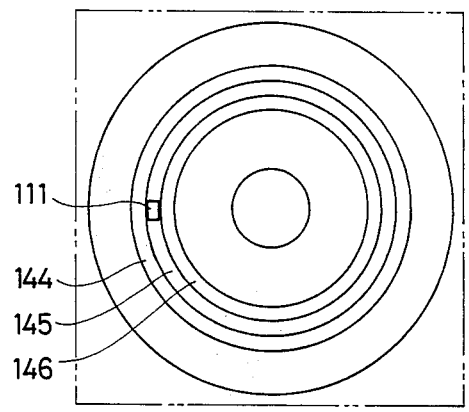
FIG. 6 illustrates the relation between a magnetic disc and a head.

The head 111 is fed by a predetermined amount by the rotation of the shaft 106 which has received the solution of the motor 11 during the upward movement stroke of the mirror, and is in contact with one of the recording tracks of the disc when the upward movement of the mirror is completed. The shutter movement is completed and after the aforementioned delay time, recording is started. After completion of the recording, the head 111 is again moved by the revolution of the motor 11 during the downward movement stroke of the mirror and, when the downward movement of the mirror is terminated, the head is positioned between a track 146 to be subsequently recorded and an already recorded track 144, as shown in FIG. 6. If the dimension between these tracks, i.e., the width of a guard band 145, is set to a value equal to or greater than the width of the tracks, the head 111 will be stopped at a position in which it is in contact with neither of the recorded track and the track to be subsequently recorded, when the downward movement of the mirror is terminated. Also, even if the width of the guard band 145 is more or less narrower than the width of the tracks and the head is in contact with the recorded track 144 or the unrecorded track 146, it can be allowed if its influence is of a negligible degree.

Photographing of a still picture is completed by the operation described above. When the mode change-over switch 7 is registered to an index mark C, the aforedescribed photographing operation is repeated as long as the release button 6 is depressed and thus, continuous photography may be accomplished.

The interlocking pin 10 provided on the finder unit 2 has a tip end projecting from the upper surface of the shoe 9 and a flange 10a coupled to a slide lever 147 which is in contact with the lever 95, as shown in FIG. 7, and is biased downwardly by a spring 138 provided between the interlocking pin 10 and the shoe 9.

The condition in which the change-over switch 4 is operated to its shown position is a condition in which the filter 92 is retracted out of the photo-taking optical path, i.e., a condition in which photography is effected under a light source of low color temperature such as an electric light. When an attempt is made to insert the shoe of the flash unit into the shoe 9 in this condition, the projected tip end of the interlocking pin 10 blocks it. Next, when the filter 92 is inserted into the photo-taking optical path and the switch 4 is slid upwardly in order to carry out photography under a light source of high color temperature such as the sun light or the illuminating light of the flash unit, the lever 147 and the interlocking pin 10 slide downwardly and the tip end of the interlocking pin 10 retracts from the upper surface of the shoe.

The interlocking pin 10 should preferably be connected to an electric circuit so as to constitute a signal transmitting line for transmitting to the flash unit the synchro contact signal provided in the camera.

Where the camera of the present embodiment is used as a video camera for taking moving pictures, an electronic view finder unit 139 is mounted instead of the finder unit 2, as shown in FIG. 8.

The electronic view finder unit 139 is moved downwardly from its shown position and fixed to the camera housing 1. Four projections 139a, 139b, 139c and 139d are provided on the lower portion of the finder unit 139. The projection 139a bears against the arm 24a of the sector gear 24 to rotate the gear 24 counter-clockwise. The counter-clockwise rotation of the sector gear 24, as already described in connection with FIG. 2, retracts the mirror 29 from the photo-taking optical path and moves the stop interlocking lever 22 to set it into a condition in which the aperture of the photo-taking lens is stopped down. The projection 139b has its inclined surface bearing against the end 63a of the lever 63 and rotates the lever 63 counter-clockwise to thereby release the restraint of the first pin 55.

The projection 139d depresses a shaft 143 to rotate the shutter charge lever 75 clockwise away from the charge pin 76 and does not block movement of the leading curtain. Therefore, the leading curtain effects movement and the light-interception of the aperture 54 is released, and the object light is imaged on an image pick-up tube or a solid state image pick-up device, not shown, positioned rearwardly of the base plate 53, irrespective of the condition of the photographing operation of the camera. The projection 139c operates a switch 140 for changing over the camera between still photography and video movie photography to change over the circuit from still photography to video photography.

Photography may be started by depressing the release button 6. Since the electric circuit is changed over to the video photography circuit by the change-over switch 140, power is not supplied to the combination magnet 52 and the motor 11 is not driven. Also, power is not supplied to the disc driving motor 122. The image pick-up circuit portion alone is operated by the depression of the release button 6, and picked-up image signals are supplied to and recorded on a separately provided recording device, not shown. The photographer can observe the state of the object during photography by looking into a finder window 139e provided in the rear portion of the electronic view finder unit.

Figure 9:
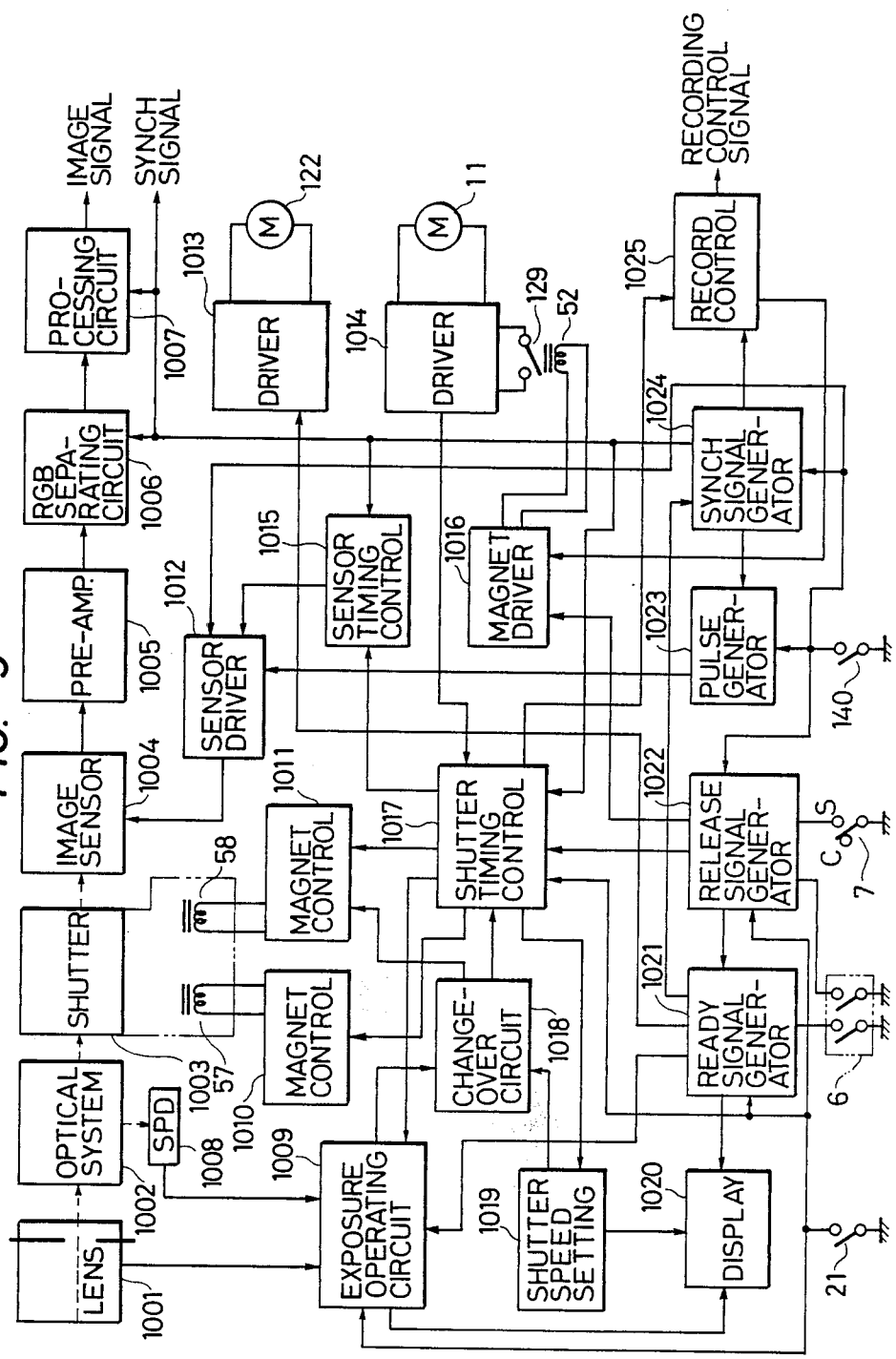
FIG. 9 is a block diagram of the electric circuit system of an electronic still camera according to an embodiment of the present invention, except the recording system thereof.
Figure 10:
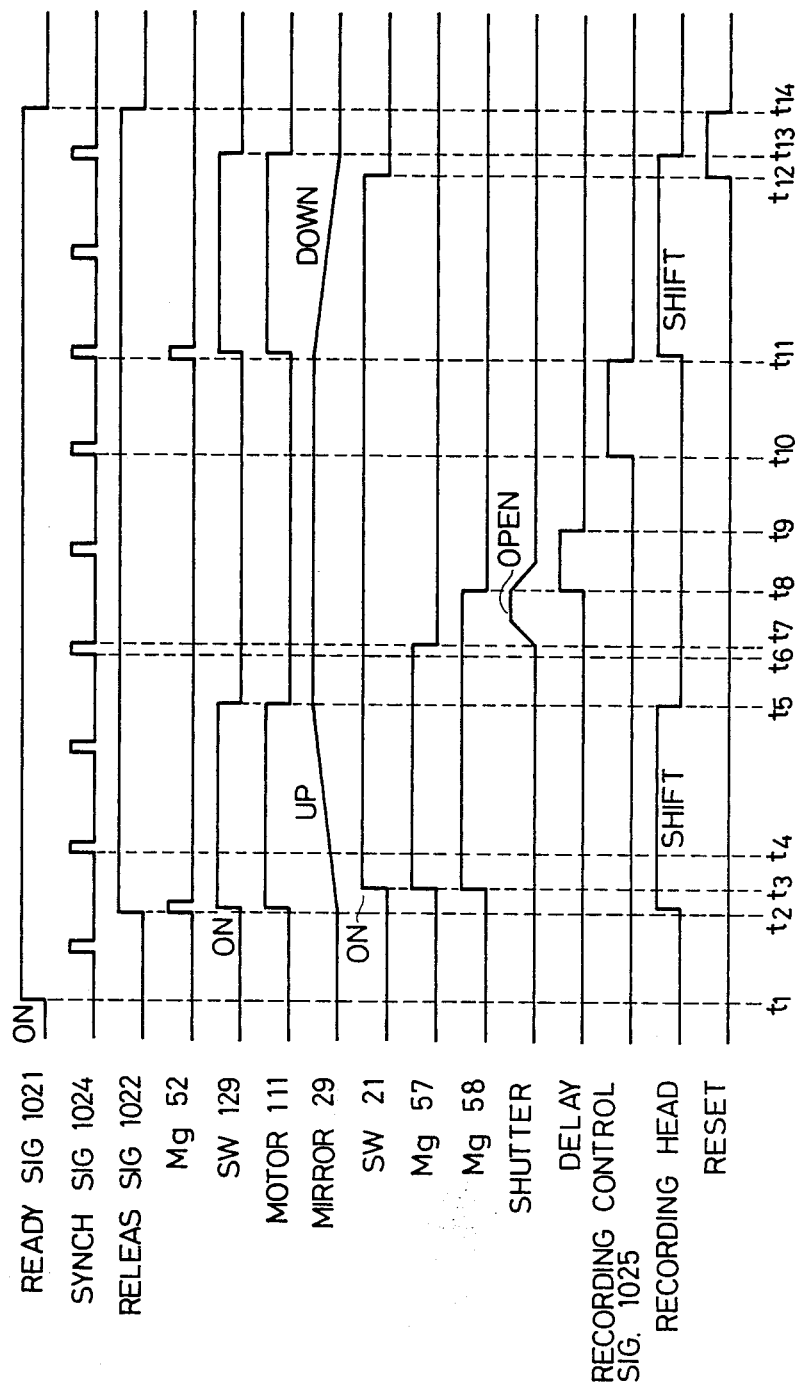
FIG. 10 is a timing chart of the electric circuit system shown in FIG. 9.

Reference is now had to FIGS. 9 and 10 to describe the electric circuit of an electronic still camera according to the present embodiment.

FIG. 9 shows a block diagram of the electric circuit in which the recording system circuit block is omitted. The light from the object to be photographed is input through a lens 1001 and directed to a metering SPD 1008 and a shutter 1003 by an optical system 1002. When the supply of power to the first and second magnets 57 and 58 of the shutter is cut off by control circuits 1010 and 1011, the shutter curtains are moved. The light passed through the shutter 1003 is converted into a time-serial electrical signal by an image sensor 1004. As regards the image sensor, CCD, MOS, CPD, etc. are well known as a solid state image pick-up device, and any of these may be used. The electrical signal having entered a separating circuit 1006 through a pre-amplifier 1005 is separated into red (R), green (G) and blue (B) chroma signals, which in turn are subjected to various necessary processings such as clamping, clipping, etc. and transferred as image signals to the recording system circuit. Also, the light which has been input to the metering SPD is converted into an electrical signal, proper exposure is operated by an exposure operating circuit 1009, the supply of power to the second magnet 58 is cut off through a magnet control circuit 1011, and the shutter is controlled so that proper exposure is obtained. A shutter speed setting circuit 1019 is a circuit for so-called manual photography adapted to operate when the photographer effects photography with the shutter speed selected by the shutter dial 5. The change-over between the auto photography using the output of the exposure operating circuit 1009 and the manual photography using the output of the shutter speed setting circuit can be set arbitrarily by a change-over circuit 1018. The user can know the exposure information during photography by a display 1020. A shutter timing control circuit 1017 is a circuit which generates each timing control signal during photography. The aforementioned image sensor is driven by a sensor driver 1012 and a sensor timing control circuit 1015. The sensor driver is driven in accordance with the driving pulse from a pulse generator 1023 which responds to a synchronizing signal generator 1024. A ready signal generating circuit 1021 generates a signal by the release button 6 being depressed to its first stroke and energizes the exposure operating circuit 1009, the display 1020, the synchronizing signal generator 1024 and the driver 1013 for driving a motor 122. Subsequently, by the release button 6 being depressed to its second stroke, a release signal generator 1022 is operated to generate a signal for starting the still photography operation. With the generation of the release signal, a magnet driver 1016 momentarily supplies power to the combination magnet 52 to close the phase switch 129 and a driver circuit 1014 drives the motor 11 to start upward movement of the mirror and control of the aperture. A record control 1025 generates a control signal for providing the timing for starting the recording operation of the recording system circuit. This signal is input to the circuit system of the recording device with a record image signal and a synchronizing signal.

Operation will now be roughly described by reference to the timing chart of FIG. 10. First, a ready signal is generated at time $t_1$ by the release button 6 being depressed to its first stroke and energizes the circuits 1009, 1013 and 1024. By the release button 6 being depressed to its second stroke, the release switch is closed at time $t_2$ to generate a release signal. Simultaneously with the generation of this signal, power is momentarily supplied to the magnet 52 and the phase switch 129 is closed, whereby the motor 11 starts to revolve. By this revolution, operations such as upward movement of the mirror, control of the aperture, etc. are started. With the upward movement of the mirror, the switch 21 changes to its ON state at time $t_3$ and in synchronism with this timing, the supply of power to the first and second magnets 57 and 58 of the shutter is started to restrain movement of the leading and trailing curtains even if mechanical limit is released.

Discharge of the unnecessary charge in the image sensor is started in synchronism with the vertical synchronizing signal at time $t_4$ immediately after generation of the release signal. Where the image sensor is a CCD, a pulse for rendering an over-flow control gate into a high voltage is generated and, where the image sensor is a CPD or an MOS, a pulse for resetting the over-flow control gate is generated. This pulse is generated from the time upward movement of the mirror is completed till the time immediately before exposure is started, that is, during the period $t_5$–$t_6$. When the mirror completes its upward movement at time $t_5$, the phase switch 129 is opened to stop the motor 11 and, in synchronism with the decay $t_7$ of the vertical synchronizing signal immediately thereafter, the supply of power to the first magnet 57 is stopped and at the same time, the leading curtain is started to initiate exposure. In the case of automatic exposure photography, the supply of power to the second magnet 58 is stopped in response to the exposure operating circuit 1009. In the case of manual photography, the supply of power is stopped after a set time. Thereby the trailing curtain is started to terminate the exposure. Thereafter, recording may be started in synchronism with the vertical synchronizing signal generated immediately thereafter, but there is an undesirable possibility that when the movement of the trailing curtain of the shutter is stopped, part of the movement energy becomes vibration and is transmitted to the camera housing to disturb rotation of the magnetic disc to thereby make good recording impossible and therefore, the recording operation is delayed for the period of time until the vibration is attenuated to such a degree that the vibration cannot impart an adverse influence. The length of this period is preset so that a delay circuit provided in the record control 1025 delays the generation of the record control signal. That is, even if there is the vertical synchronizing signal within the delay period $t_8$–$t_9$, the record control signal is not generated and recording is started in synchronism with the vertical synchronizing signal $t_{10}$ immediately after the delay period terminates. As soon as the recording by the recording device is terminated, power is again momentarily supplied to the magnet 52 and the phase switch 129 is closed. Thus, the motor 11 starts to revolve and the mirror begins to move downwardly. At the time $t_{12}$ immediately before the downward movement of the mirror is completed, the switch 21 changes from its ON position to its OFF position. In response thereto, the reset circuit in the release signal and ready signal generating circuit starts to operate. When the downward movement of the mirror is completed, the phase switch 129 is opened to stop the motor 11. At time $t_{14}$ slightly later than the time $t_{13}$, the reset circuit turns off the release signal and the ready signal, thus completing the sequence of still photography. In the case of the continuous photography mode, only the release signal is reset at time $t_{14}$ and, in a condition in which the button 6 has been depressed to its second stroke, the release signal is again generated immediately after reset and the still photographing operation up to $t_2$–$t_{14}$ is repeated. Feeding of the recording head is effected during the period in which the motor 11 is revolving, that is, during the period $t_2$–$t_5$ or $t_{11}$–$t_{13}$.

Where the camera is used as a video camera with the finder unit 2 replaced by the electronic view finder unit 139, the change-over switch 140 of FIG. 9 is operated and only the circuit blocks 1004–1007, 1012, 1023 and 1024 operate to input image signals to the electronic view, finder and the image recording device. The design should preferably be such that by the button 6 being depressed to its second stroke, an image signal, although not shown, is input to the image recording device, whereby image recording is executed.

We claim:

1. A multi-mode electronic camera, comprising:
   imaging lens means for forming imaged light flux into an optical image of an object to be photographed;
   image pick-up means for converting said optical image into the form of an electrical signal;
   first monitoring means including an optical view finder provided for observation of said optical image;
   second monitoring means responsive to said electrical signal for reproducing and displaying said optical image;
   a movable mirror member provided in the optical path of said imaged light flux and displaceable between a first position for directing said imaged light flux from said imaging lens means to said optical view finder and a second position for directing said imaged light flux to said image pick-up means;
   means for generating a start signal;
   means for switching between a first monitoring mode utilizing said first monitoring means and a second monitoring mode utilizing said second monitoring means; and
   means for driving said movable mirror member from said first position to said second position in response to said start signal during said first monitoring mode, and for driving said movable mirror member to said second position when said first monitoring mode is switched over to said second monitoring mode.

2. A camera according to claim 1, wherein said second monitoring means includes an electronic view finder for displaying said optical image on the basis of said electrical signal and wherein said switching means connects said electronic view finder with said image pick-up means to switch over from said first monitoring mode to said second monitoring mode.

3. A camera according to claim 1 further comprising a focal plane shutter disposed between said image pick-up means and said movable mirror member, and shutter driving means for causing said focal plane shutter to be open when said first monitoring mode is switched over to said second monitoring mode.

4. A camera according to claim 1 having a still picture photographing mode and a motion picture photographing mode, and wherein said switching means switches to said still picture photographing mode when said first monitoring means is utilized and to said motion picture photographing mode when said second monitoring means is utilized.

* * * * *